United States Patent

Henn et al.

[11] Patent Number: 6,062,071
[45] Date of Patent: May 16, 2000

[54] METHOD FOR DETECTING COMBUSTION MISFIRES IN AN INTERNAL COMBUSTION ENGINE

[75] Inventors: Michael Henn, Billigheim; Anton Angermaier, Thann, both of Germany

[73] Assignee: Siemens Aktiengesellschaft, Munich, Germany

[21] Appl. No.: 09/088,295

[22] Filed: Jun. 1, 1998

Related U.S. Application Data

[63] Continuation of application No. PCT/DE96/02097, Nov. 4, 1996.

[30] Foreign Application Priority Data

Nov. 30, 1995 [DE] Germany .................. 195 44 720

[51] Int. Cl.⁷ .................................................. G01M 15/00
[52] U.S. Cl. ........................................................ 73/117.3
[58] Field of Search ................................ 73/116, 117.3, 73/35.01, 35.03, 35.06, 117.2; 123/406.18, 406.23, 406.24, 436; 701/110, 111

[56] References Cited

U.S. PATENT DOCUMENTS

| | | | |
|---|---|---|---|
| 5,237,504 | 8/1993 | Holmes et al. | 73/116 |
| 5,345,817 | 9/1994 | Grenn et al. | 73/117.3 |
| 5,377,537 | 1/1995 | James . | |
| 5,531,108 | 7/1996 | Feldkamp et al. | 73/117.3 |
| 5,789,658 | 8/1998 | Henn et al. | 73/116 |

FOREIGN PATENT DOCUMENTS

| | | |
|---|---|---|
| 0437057A1 | 7/1991 | European Pat. Off. . |
| 0576705A1 | 1/1994 | European Pat. Off. . |
| 0583495A1 | 2/1994 | European Pat. Off. . |
| 0583496A1 | 2/1994 | European Pat. Off. . |
| 4138765A1 | 7/1992 | Germany . |
| 4333698A1 | 4/1995 | Germany . |

Primary Examiner—Eric S. McCall
Attorney, Agent, or Firm—Herbert L. Lerner; Laurence A. Greenberg; Werner H. Stemer

[57] ABSTRACT

A method for detecting combustion misfires in an internal combustion engine is based on the speed of rotation of the crankshaft. An unsteady running value is derived from measured cylinder segment times and subsequent correction of mechanical teeth defects. A disturbance caused by torsional oscillations of the crankshaft is taken into account by a cylinder-selective disturbance variable compensation dependent on load and speed of rotation.

7 Claims, 4 Drawing Sheets

METHOD FOR DETECTING COMBUSTION MISFIRES IN AN INTERNAL COMBUSTION ENGINE

CROSS-REFERENCE TO RELATED APPLICATION

This application is a continuation of International Application No. PCT/DE96/02097, filed Nov. 4, 1996, which designated the United States.

BACKGROUND OF THE INVENTION

1. Field of the Invention

The invention relates to a method for detecting combustion misfires in a multi-cylinder internal combustion engine by evaluating the rotational speed of the crankshaft, which includes measuring segment times required by a crankshaft to pass through prescribed angular ranges during working cycles of individual cylinders; correcting the segment times by a correction factor including mechanical tolerances of a rotational speed pickup; calculating unsmooth-running values from the corrected segment times; and comparing the unsmooth-running values with a threshold value and registering a combustion misfire if the threshold value is exceeded.

The occurrence of combustion misfires in an internal combustion engine can lead, on one hand, to an increase in a rate of emission of pollutants and, on the other hand, to destruction of a catalytic converter disposed in an exhaust-gas tract of the internal combustion engine, or at least to degradation of its conversion capability due to post-reactions of an uncombusted air/fuel mixture.

The detection of such combustion misfires is therefore required in order to monitor compliance with legal limits for the emissions during operation. Detecting the combustion misfires from the crankshaft speed measured through the use of incremental sensors provides a cost-effective way of implementing that objective.

Therefore, a plurality of methods have already been disclosed which detect combustion misfires by measuring segment times that the crankshaft requires during working cycles of individual cylinders in order to pass through prescribed angular ranges. Then, unsmooth-running values are calculated from the segment times and those values are compared with threshold values. Errors in the segment time measurement are detected and corrected during times of overrun fuel cut-off conditions of the internal combustion engine. Such a method is disclosed, for example, in European Patent Application 0 583 496 A1, corresponding to U.S. Pat. No. 5,377,536.

Combustion misfires lead to a temporary slowing of the angular speed of the crankshaft. That effect is very small so that the angular speed has to be determined very precisely.

Therefore, European Patent Application 0 576 705 A1 proposes that the general rotational speed tendency and additionally inconstant changes of rotational speed should be taken into account during the measurement of the rotational speed in a method for detecting combustion misfires, in addition to a statistical component, so that incorrect detections can be very largely excluded even when operation is very far from steady-state conditions.

Tolerances and reproduction deviations relating to manufacturing (for example mechanical gear faults) or relating to the installation of the incremental sensor on the crankshaft (for example eccentric mounting) also lead to inaccuracies when measuring the angular speed and thus to possible incorrect detections when detecting combustion misfires.

European Patent Application 0 583 495 A1 discloses a method for detecting and correcting errors when performing time measurements on rotating shafts, in particular on crankshafts. In that case, measurements are made of segment times which the shaft requires in order to rotate through a defined angular range (segment), and those times are then compared with a time which applies for a reference segment. When the internal combustion engine is in an overrun mode, a correction value is determined which permits the measured segment time to be corrected on either a cylinder-specific or segment-specific basis.

Furthermore, reactions of the road and the mechanical behavior of the crankshaft itself influence the speed behavior of the crankshaft and thus make it more difficult to detect combustion misfires. In particular, in the case of multi-cylinder series-mounted engines with a long crankshaft, torsional vibrations occur which can no longer be ignored and which may falsify the result of a detection of combustion misfires. That can take place to such an extent that in higher rotational speed ranges it is no longer possible to ensure that the detection will be reliable for all of the cylinders when using conventional methods.

SUMMARY OF THE INVENTION

It is accordingly an object of the invention to provide a method for detecting combustion misfires in an internal combustion engine, which overcomes the hereinafore-mentioned disadvantages of the heretofore-known methods of this general type and which permits an even more precise and reliable detection of combustion misfires, in comparison with the prior art.

With the foregoing and other objects in view there is provided, in accordance with the invention, a method for detecting combustion misfires in a multi-cylinder internal combustion engine by evaluating a rotational speed of a crankshaft, which comprises the following steps: measuring segment times required by a crankshaft to pass through prescribed angular ranges during working cycles of individual cylinders; correcting the segment times by a correction factor including mechanical tolerances of a rotational speed pickup; calculating unsmooth-running values from the corrected segment times; comparing the unsmooth-running values with a threshold value and registering a combustion misfire if the threshold value is exceeded; and impressing an interference variable in dependence on an operating state of the internal combustion engine and taking a rotational speed influence caused by torsion vibrations of the crankshaft into account.

According to a first embodiment of the invention, there is provided a method which comprises carrying out the impression of the interference variable with an additional correction of the segment times by cylinder-specific correction factors for the segment times.

In accordance with another mode of the invention, there is provided a method which comprises making the correction factors dependent on a load and a rotational speed of the internal combustion engine in cylinder-specific characteristic diagrams.

In accordance with a further mode of the invention, there is provided a method which comprises carrying out the impression of the interference variable according to the following relationship: $TK_n = (1 - K_n - KTOR_n) T_n$, where:

$T_n$ = the segment time;
$KTOR_n$ = the cylinder-specific correction factor;
$K_n$ = the correction factor; and
$TK_n$ = the corrected segment time.

According to a second embodiment of the invention, there is provided a method which comprises carrying out the impression of the interference variable with a correction of the unsmooth-running values by cylinder-specific correction factors for the unsmooth-running values; and storing the factors in cylinder-specific characteristic diagrams as a function of a load and a rotational speed of the internal combustion engine.

In accordance with an added mode of the invention, there is provided a method which comprises carrying out the impression of an interference variable according to the following relationship: $LU_n = LU_n^* - LUTOR_n$ where:

$LK_n$ = the corrected unsmooth-running value;

$LU_n^*$ = the uncorrected unsmooth-running value; and $LUTOR_n$ = an interference variable including torsional vibration.

In accordance with an additional mode of the invention, there is provided a method which comprises additionally taking a cylinder-specific weighting factor $GFAK_n$ according to a relationship $LU_n = GFAK_n(LU_n^* - LUTOR_n)$ into account during the impression of the interference variable; and storing the weighting factor $GFAK_n$ as a function of rotational speed in a characteristic diagram, where:

$LU_n$ = the compensated unsmooth-running value;

$LU_n^*$ = the uncompensated unsmooth-running value; and $LUTOR_n$ = the interference variable including torsional vibration.

According to a third embodiment of the invention, there is provided a method which comprises carrying out the impression of the interference variable by cylinder-specific threshold values for the unsmooth-running values.

An unsmooth-running value is determined from the measured cylinder segment times after a correction of the mechanical gear errors which are periodic over one revolution. The disruption caused by the torsional vibrations of the crankshaft is suppressed by impressing a cylinder-selective interference variable as a function of the range of the load and rotational speed of the operating point of the internal combustion engine. Values for impressing interference variables are determined on a vehicle test bench and stored in cylinder-specific characteristic diagrams.

Other features which are considered as characteristic for the invention are set forth in the appended claims.

Although the invention is illustrated and described herein as embodied in a method for detecting combustion misfires in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
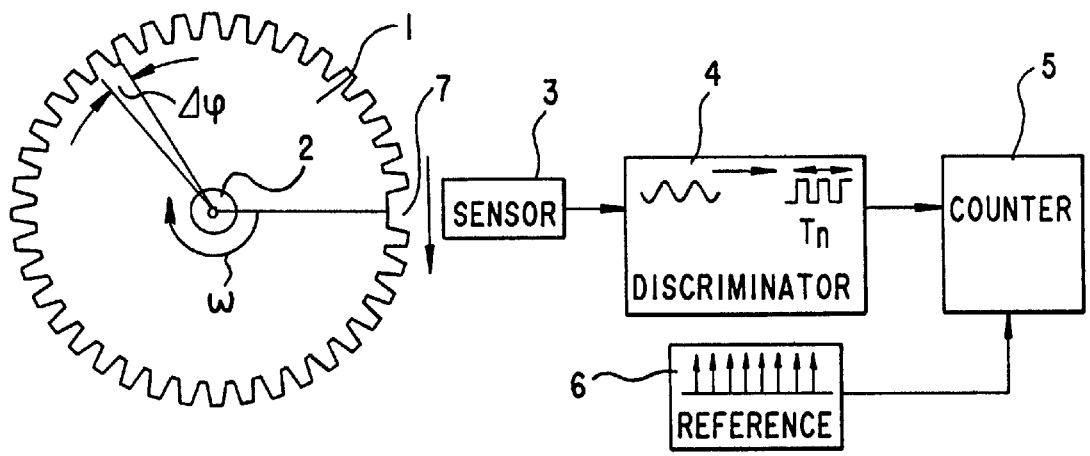
FIG. 1 is a diagrammatic and schematic representation of a measurement principle for determining an angular speed of a crankshaft.

Referring now to the figures of the drawings in detail and first, particularly, to FIG. 1 thereof, there is seen a sensor gear wheel 1 which has ferromagnetic teeth and angular increments with a width of $\Delta \phi$ and is mounted on a crankshaft 2. A voltage signal which fluctuates with a distance from an end surface of the gear wheel is produced by a magnetic pickup 3, for example a Hall sensor or an inductive sensor, during rotary movement of the crankshaft 2. The gear wheel thus forms a modulator for converting an angular speed input variable which is analogous with amplitude into a signal which is analogous with frequency. Zero crossovers of this signal also contain information relating to an instantaneous angle. A magnetic field which originates from a permanent magnet in the sensor 3 changes as a result of a sequence of the tooth gaps and of the ferromagnetic teeth of the sensor gear wheel 1.

A discriminator 4, which may include, for example, a Schmitt trigger and a signal edge detector, produces a square-wave signal from the signal provided by the sensor 3. The square-wave signal is defined by a distance between two signal edges $T_n$, referred to below as a segment time. A quantization of this signal is carried out with the aid of a counter 5 and a reference frequency 6. A counter reading which is obtained in this way is $$\frac{\Delta \phi}{T(n)},$$

and is thus a measure of an angular speed $\omega$.

A range 7 for an angular reference is obtained by hollowing out one or more teeth on the sensor gear wheel 1. The range 7 can be used to determine an absolute angle. Sixty teeth minus one gap of two teeth has become the accepted standard for pulse transmitters on the crankshaft of internal combustion engines.

If the angular speed of the crankshaft is determined in a 6-cylinder, 4-stroke internal combustion engine, for example over 120° through the use of an incremental sensor by measuring the time $T_n$ required to pass through a cylinder segment, a value sequence of $T_n$ can be used to detect combustion misfires.

Figure 2:
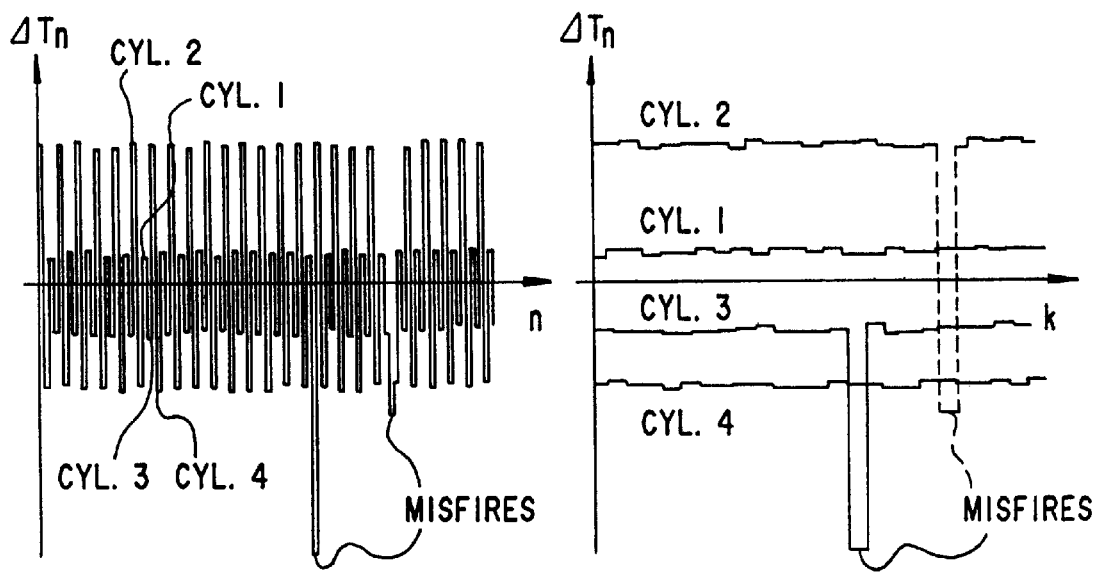
FIG. 2 includes diagrams illustrating differences between segment times without correction.

A combustion misfire is then expressed as a characteristic notch in the signal profile in a difference between two successive segment times $\Delta T_n = T_n - T_{n-1}$ or a difference between segment times $\Delta T_n / T_n^3$ which is normalized as $T_n^3$. Unfortunately, even during steady-state operation of the internal combustion engine without combustion misfires, i.e. in a fault-free situation, the sequences $\Delta T_n$ or $\Delta T_n / T_n^3$ are cylinder-specific deviations which recur repeatedly at the same operating point for a specific vehicle. Particularly at high rotational speed ranges, these faults make it more difficult, or even impossible, to reliably detect combustion misfires. FIG. 2 illustrates this, by way of example, for a 4-cylinder internal combustion engine. In the left-hand half of FIG. 2, the differences $\Delta T_n$ between the segment times are plotted in succession in accordance with an ignition sequence 2-1-3-4, while in the representation in the right-hand half of FIG. 2 they are split according to cylinders.

The cause of these faults lies, on one hand, in the production tolerances of the sensor gear wheel and, on the other hand, in the torsional vibrations of the crankshaft. While the mechanical inaccuracies of the sensor gear wheel have to be determined in an adaptation process for each individual vehicle, the torsional faults are characteristic of a specific vehicle type. In order to eliminate the disturbing influence, the two interference sources can be split by adapting the gear wheel errors into operating ranges in which no torsional faults or only low torsional faults occur. The deviations between the segment times of the individual cylinders, which are due to the torsion of the crankshaft, can be determined for one vehicle type from the values $\Delta T_n$ and $\Delta T_n/T_n^3$, corrected for the gear wheel errors, or variables derived therefrom, from measurements during fault-free steady-state operation on a test bench. If the data are stored in a characteristic diagram for each cylinder plotted against the load and the rotational speed of the internal combustion engine, interference variable compensation can be carried out by subtracting the values which have been interpolated from the characteristic diagram.

Figure 3:
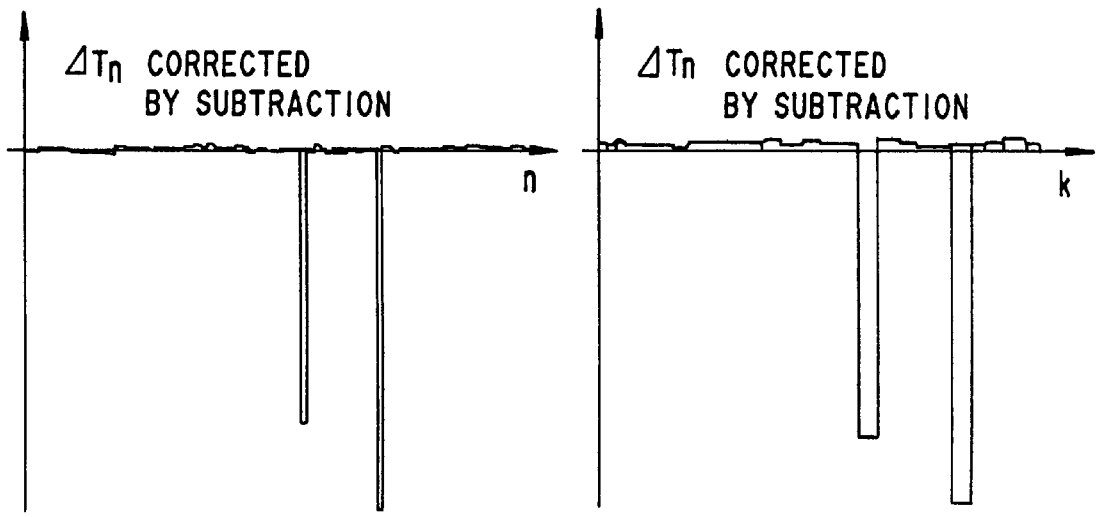
FIG. 3 includes diagrams illustrating differences between segment times with correction through the use of subtraction.

If the signal profiles according to FIG. 2 are corrected in this way, an illustration such as that given in FIG. 3 is obtained.

Figure 4:
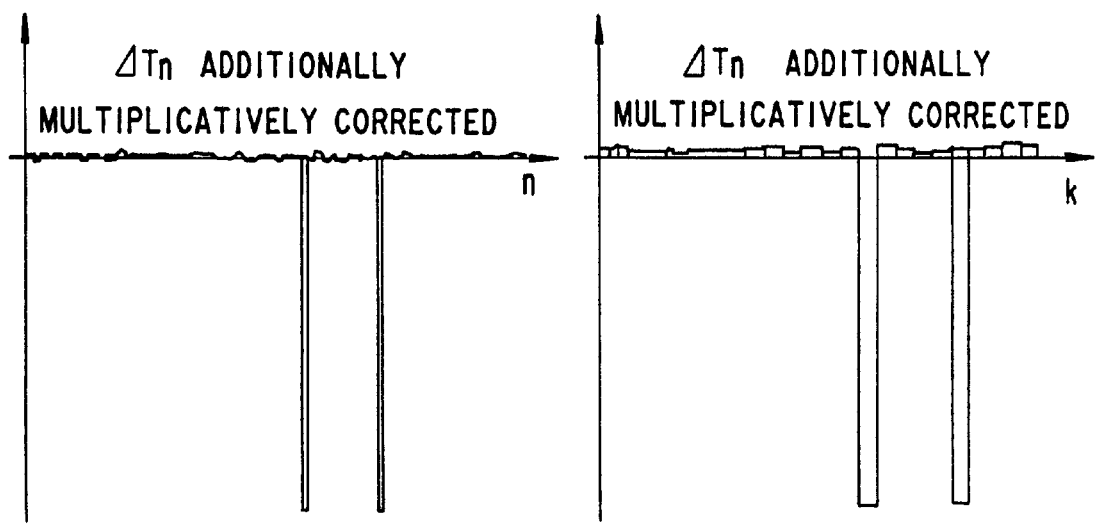
FIG. 4 includes diagrams illustrating differences between segment times with correction through the use of subtraction and multiplication.

On average, the subtraction of the interference variable adjusts the values for all of the cylinders to a zero value only during misfire-free operation. If a combustion misfire occurs, the signal notches for the segment time differen-tials of different cylinders differ. The multiplication by a cylinder-specific factor levels out these different values in the case of a misfire. When the internal combustion engine is misfiring, the factors can be determined on a vehicle test bench and stored in a characteristic diagram. FIG. 4 shows the signal profile $\Delta T_n$ of the cylinders which are equalized by the additional multiplication.

In the method according to European Patent Application 0 576 705 A1, an unsmooth-running value $LU_n$ is calculated from the measured segment times $T_n$ for each cylinder on the basis of the difference $\Delta T_n$ between two cylinder segments. That value $LU_n$ is compared with a threshold $LUG_n$ which is calculated from the measured load, rotational speed and temperature through the use of characteristic diagrams. When the threshold is exceeded, the system concludes that a misfire has occurred. The method described in European Patent Application 0 583 496 A1, corresponding to U.S. Pat. No. 5,377,536, also takes into account mechanical gear-wheel tolerances by correcting the measured segment times $T_n$ to $TK_n$:

$$TK_n=(1-K_n)T_n.$$

In this case the correction factors $K_n$ are adapted in the overrun fuel cut-off operating state of the engine.

If such a method of unsmooth-running calculation is used without taking into account the disruption as a result of torsional vibrations, large differences of unsmooth-running values occur for the different cylinders as the rotational speeds increase. Misfires may be detected incorrectly or not at all as a result of the small signal amplitude which a misfire produces at high rotational speeds and low loads.

The torsional vibrations of the crankshaft are suppressed as described below by impressing an interference variable. In a flowchart of an algorithm for detecting combustion misfires, various possible ways are provided of taking such an impression of an interference variable into account:

the correction can be carried out together with a correction of mechanical gear-wheel tolerances:

$$TK_n=(1-K_n-KTOR_n)T_n$$

The correction factors $KTOR_n$ which contain the influence of the torque are calculated from cylinder-specific characteristic diagrams as a function of load and rotational speed.

The next possibility is subtracting a cylinder-specific value $LUTOR_n$ during the calculation of the unsmooth running:

$$LU_n=LU_n^*-LUTOR_n$$

$LUTOR_n$ is in turn determined from load-dependent and rotational speed-dependent characteristic diagrams for each cylinder. $LU_n^*$ is the calculated unsmooth running without taking the torsional vibration into account.

Finally, the impression of an interference variable can be allowed for, through the use of cylinder-specific characteristic diagrams while the threshold value $LUG_n$ is being determined.

Figure 5:
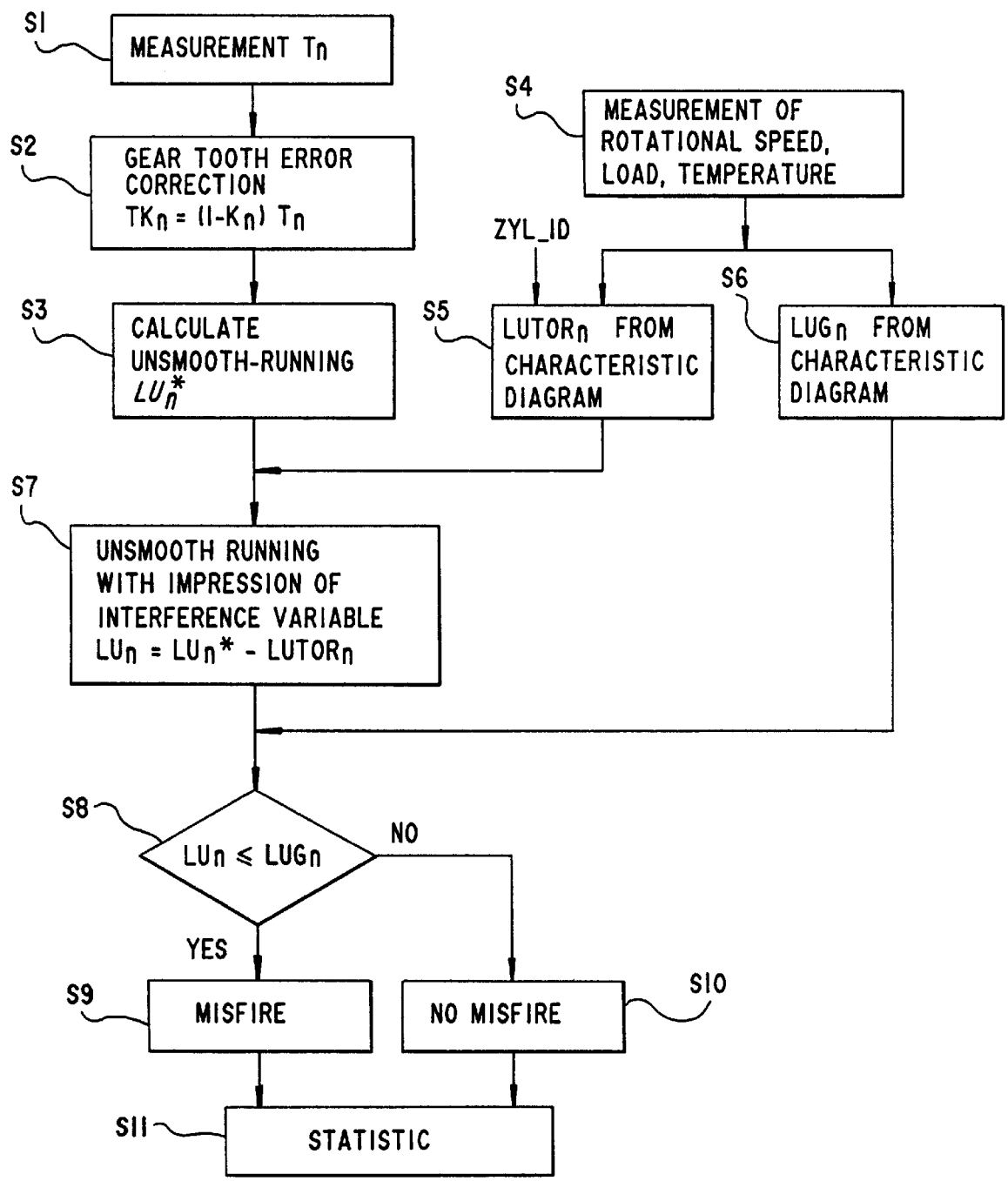
FIG. 5 is a flowchart relating to a detection of combustion misfires with an impression of interference variables in order to correct a disturbing torque occurring as a result of torsional vibrations.

Of the specified possible ways of impressing an interference variable, a method for detecting combustion misfires in which the disturbing torque is taken into account through the use of cylinder-specific correction values, will be explained in more detail with reference to FIG. 5.

In a first method step S1, the segment times $T_n$ are measured, i.e. those time periods which the crankshaft requires in order to rotate through a specific crank angle during the working cycle of a cylinder. This can be carried out, for example, with a device according to FIG. 1. Then, the measured segment times $T_n$ are corrected in a method step S2. Such a correction is necessary since the inaccuracies which occur due to tolerances and reproduction deviations relating to manufacturing or relating to the installation of the incremental angular sensor, for example a sensor wheel on the crankshaft, would lead to the angular speed being determined incorrectly, and thus to a possible incorrect detection of combustion misfires. The tooth error correction in step S2 takes place according to the relationship:

$$TK_n=(1-K_n)T_n$$

where $T_n$: the measured, uncorrected segment time;

$K_n$: the correction factor; and $Tk_n$: the corrected segment time.

In this case the correction factors $K_n$ are adapted in an overrun fuel cut-off operating state (overrun mode) of the internal combustion engine, such as is described, for example, in European Patent Application 0 583 495 A1. In that known method for detecting and correcting errors in the time measurement of rotating shafts, the segment time of a reference segment of a reference cylinder is measured and stored, and then the segment times of the segments associated with the individual cylinders are measured successively for all of the cylinders. Two crankshaft revolutions later, the segment time of that reference segment is measured for the same reference cylinder, and successive correction values are calculated for the individual segments assigned to the cylinders of the internal combustion engine, and those correction values are then averaged.

So-called uncompensated unsmooth-running values $LU_n^*$ are calculated in the method step S3 according to any desired known method at the segment times $TK_n$ which are corrected in that way and which take into account the mechanical gear-wheel tolerances. Depending on the type of method used, various dynamic influences which occur while the internal combustion engine is operating (acceleration, deceleration) are compensated for in this case. Such a method for calculating unsmooth-running values is described, for example, in European Patent Application 0 576 705 A1. According to that known method, an unsmooth-running value is determined for each cylinder by measuring the successive time periods (segment times) which the crankshaft requires during the working cycles of the cylinders that are successive in terms of the ignition sequence, in order to pass through prescribed angular ranges. Those unsmooth-running values are composed of a static component, a dynamic component which takes into account the general rotational speed tendency, and a component which takes into account the changes in acceleration and deceleration. Those components are respectively calculated on the basis of the difference between the time periods of directly successive cylinders and on the basis of the difference between the time periods of cylinders which are further apart.

Simultaneously with the measurement of the segment times $T_n$, the rotational speed, the load and the temperature of the internal combustion engine are measured continuously in the method step S4 through the use of corresponding sensors. In the method step S5, the additive interference variables $LUTOR_n$, which take into account the torsional vibration, are determined from characteristic diagrams which cover the rotational speed and load and are stored in a memory of an electronic control device of the internal combustion engine. In this case, a separate characteristic diagram is available for each cylinder. Selection is carried out through the use of a cylinder-identification signal ZYL_ID. This signal can be obtained, for example, by determining the absolute angle of the crankshaft using the toothed gap of the sensor wheel as an angular reference and through the use of a signal of a camshaft sensor wheel.

The values stored in the characteristic diagrams are determined on a vehicle test bench for the corresponding type of drive.

In a method step S7, the interference variable $LUTOR_n$ is subtracted from the uncompensated unsmooth-running value $LU_n^*$ from method step S3, in order to obtain the compensated unsmooth-running value $LU_n$. This compensated unsmooth-running value $LU_n$ is compared, in a method step S8, with a threshold value $LUG_n$ which is calculated from the measured load, rotational speed and temperature of the internal combustion engine through the use of characteristic diagrams (method step S7).

If the unsmooth-running value $LU_n$ with an impressed interference variable is smaller than the threshold value $LUG_n$, a combustion misfire is registered in a method step S9. If the value $LU_n$ is greater than or equal to the threshold value, no combustion misfire is registered in a method step S10. Both results of the inquiry in the method step S8 are fed to a statistical evaluation in a method step S11, since in the case of individual detected combustion misfires, the risk of an incorrect detection would be too large due to unreproducible influences. Controlling measures, such as shutting off the injection to individual cylinders are therefore taken only if the statistical frequency of such combustion misfires exceeds a specific prescribed limit.

It is apparent that the unsmooth-running values for a misfire for different cylinders can be slightly different under otherwise identical operating conditions of the internal combustion engine. This is due to the fact that the fault as a result of the torsional vibration in the case of a combustion misfire varies slightly in comparison with fault-free operation without misfires. If necessary, a factor $GFAK_n$ can also be taken into account for approximated correction during the calculation of the compensated unsmooth-running value $LU_n$ in the step S7:

$$LU_n = GFAK_n(LU_n^* - LUTOR_n) \qquad (S7a)$$

The factor $GFAK_n$ is a cylinder-specific weighting factor which is determined through the use of a characteristic diagram by way of the rotational speed.

Figure 6:
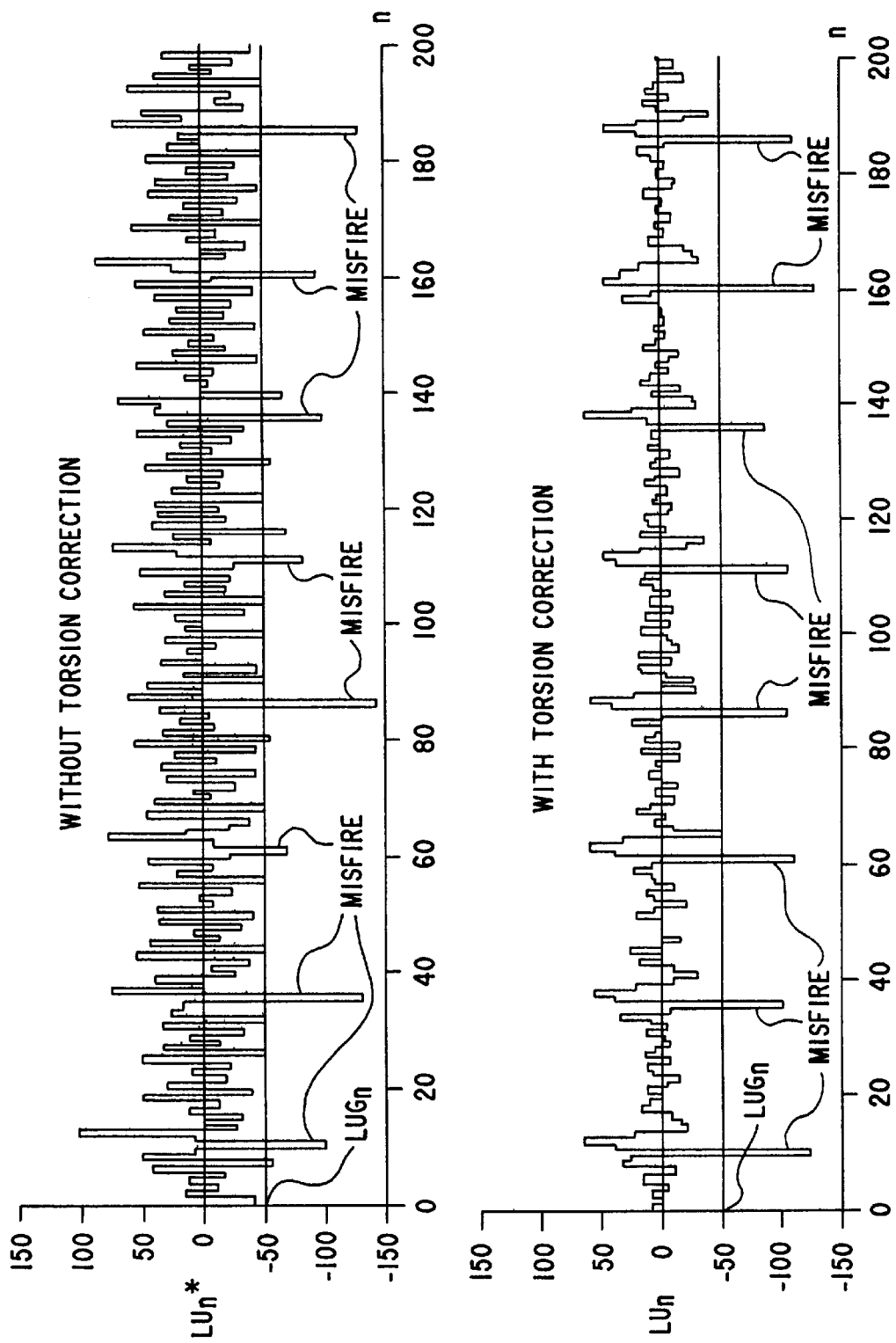
FIG. 6 is a diagram showing a comparison of unsmooth-running values with and without correction of a torque at measured values.

The results which can be achieved with this method for a 6-cylinder series-mounted engine with a rotational speed of 6000 1/min and a load of 250 mg/stroke are shown by a diagram in FIG. 6. The calculated unsmooth-running values $LU_n^*$ for specific discreet angles n without taking into account the torsion correction are plotted in the upper half of FIG. 6.

The lower half of FIG. 6 shows the unsmooth-running values $LU_n$ with torsion correction in accordance with the method according to the invention for the same internal combustion engine at the same working point. If the two illustrations are compared with one another, it is clear that the risk of incorrect detection of combustion misfires can be significantly reduced by taking the torque interference variable into account. If, for example, the threshold value $LUG_n$, above which a combustion misfire is detected, is set at the value of −50, in the method without correction, unsmooth-running values which lie above the threshold value are incorrectly registered as combustion misfires although the threshold value is not exceeded as a result of the misfire but rather due to torsional vibrations of the crankshaft.

We claim:

1. A method for detecting combustion misfires in a multi-cylinder internal combustion engine by evaluating a rotational speed of a crankshaft, which comprises the following steps:

measuring segment times required by a crankshaft to pass through prescribed angular ranges during working cycles of individual cylinders;

correcting the segment times by a correction factor including mechanical tolerances of a rotational speed pickup;

calculating unsmooth-running values from the corrected segment times;

comparing the unsmooth-running values with a threshold value and registering a combustion misfire if the threshold value is exceeded;

impressing an interference variable in dependence on an operating state of the internal combustion engine and taking a rotational speed influence caused by torsion vibrations of the crankshaft into account; and carrying out the impression of the interference variable with an additional correction of the segment times by cylinder-specific correction factors for the segment times.

2. The method according to claim 1, which comprises making the correction factors dependent on a load and a rotational speed of the internal combustion engine in cylinder-specific characteristic diagrams.

3. The method according to claim 1, which comprises carrying out the impression of the interference variable according to the following relationship:

$$TK_n = (1 - K_n - KTOR_n)T_n,$$

where:

$T_n$ = the segment time;

$KTOR_n$ = the cylinder-specific correction factor;

$K_n$ = the correction factor; and $TK_n$ = the corrected segment time.

4. A method for detecting combustion misfires in a multi-cylinder internal combustion engine by evaluating a rotational speed of a crankshaft, which comprises the following steps:

measuring segment times required by a crankshaft to pass through prescribed angular ranges during working cycles of individual cylinders;

correcting the segment times by a correction factor including mechanical tolerances of a rotational speed pickup;

calculating unsmooth-running values from the corrected segment times;

comparing the unsmooth-running values with a threshold value and registering a combustion misfire if the threshold value is exceeded;

impressing an interference variable in dependence on an operating state of the internal combustion engine and taking a rotational speed influence caused by torsion vibrations of the crankshaft into account;

carrying out the impression of the interference variable with a correction of the unsmooth-running values by cylinder-specific correction factors for the unsmooth-running values; and storing the factors in cylinder-specific characteristic diagrams as a function of a load and a rotational speed of the internal combustion engine.

5. The method according to claim 4, which comprises carrying out the impression of an interference variable according to the following relationship:

$$LU_n = LU_n^* - LUTOR_n$$

where:

$LU_n$ = the compensated unsmooth-running value;

$LU_n^*$ = the uncompensated unsmooth-running value; and $LUTOR_n$ = an interference variable including torsional vibration.

6. The method according to claim 5, which comprises additionally taking a cylinder-specific weighting factor $GFAK_n$ according to a relationship $LU_n = GFAK_n(LU_n^* - LUTOR_n)$ into account during the impression of the interference variable; and storing the weighting factor $GFAK_n$ as a function of rotational speed in a characteristic diagram, where:

$LU_n$ = the compensated unsmooth-running value;

$LU_n^*$ = the uncompensated unsmooth-running value; and $LUTOR_n$ = the interference variable including torsional vibration.

7. A method for detecting combustion misfires in a multi-cylinder internal combustion engine by evaluating a rotational speed of a crankshaft, which comprises the following steps:

measuring segment times required by a crankshaft to pass through prescribed angular ranges during working cycles of individual cylinders;

correcting the segment times by a correction factor including mechanical tolerances of a rotational speed pickup;

calculating unsmooth-running values from the corrected segment times;

comparing the unsmooth-running values with a threshold value and registering a combustion misfire if the threshold value is exceeded;

impressing an interference variable in dependence on an operating state of the internal combustion engine and taking a rotational speed influence caused by torsion vibrations of the crankshaft into account; and carrying out the impression of the interference variable by cylinder-specific threshold values for the unsmooth-running values.

* * * * *